United States Patent Office.

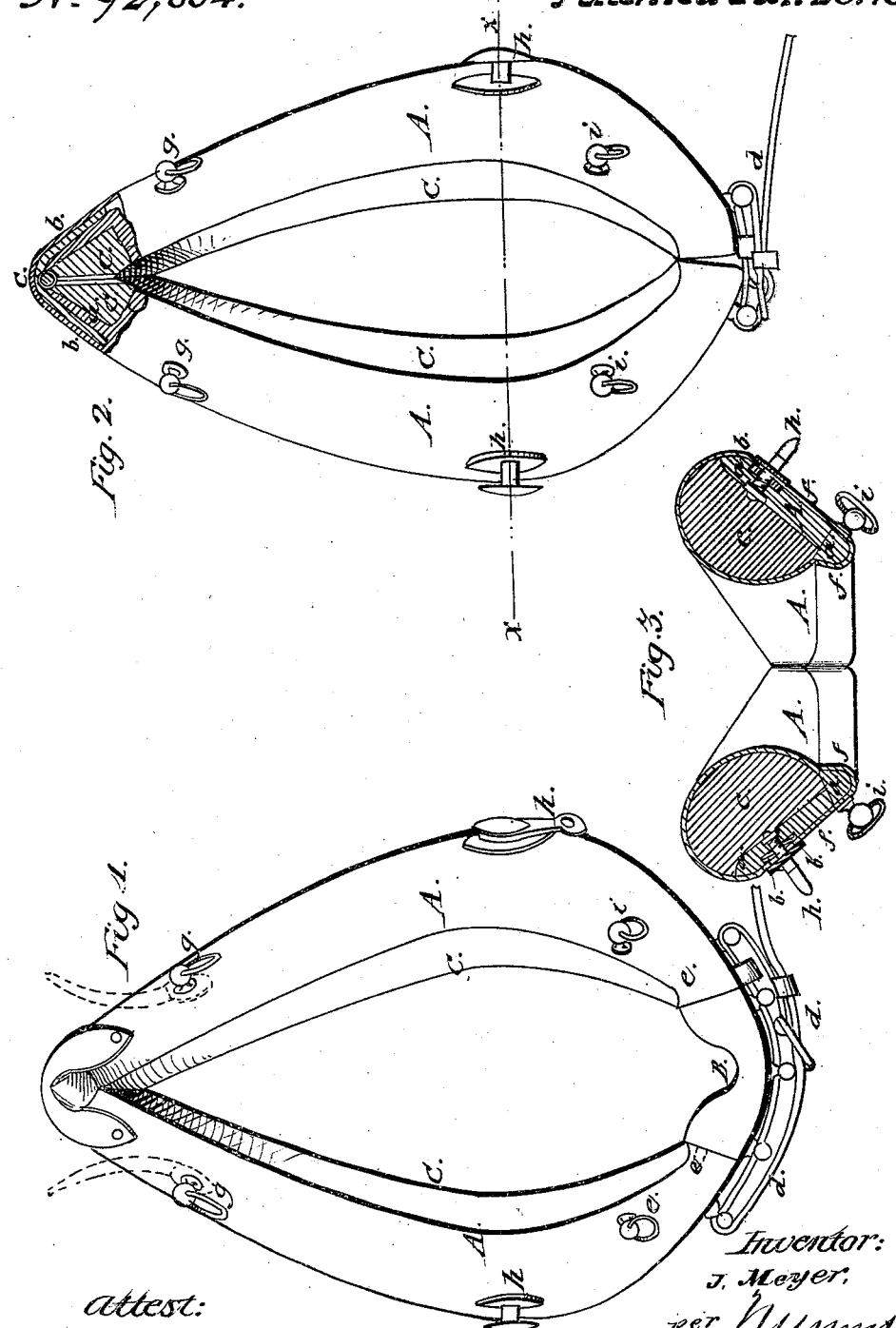

JACQUES MEYER, OF WILLIAMSBURG, NEW YORK.

*Letters Patent No. 92,864, dated July 20, 1869.*

IMPROVED HORSE-COLLAR.

The Schedule referred to in these Letters Patent and making part of the same.

*To all whom it may concern:*

Be it known that I, JACQUES MEYER, of Williamsburg, Kings county, New York, have invented a new and improved Horse-Collar; and I do hereby declare that the following is a full, clear, and exact description thereof, which will enable others skilled in the art to make and use the same, reference being had to the accompanying drawings, forming part of this specification.

Figure 1 represents a front view of my improved collar.

Figure 2 is a front view, partly in section, of the same.

Figure 3 is a horizontal section of the same, taken on the line $x\ x$, fig. 2.

Similar letters of reference indicate corresponding parts.

This invention relates to certain improvements in horse-collars, whereby the same can be made adaptable to all sizes of horses' necks, and whereby separate hames can be dispensed with.

The invention consists, first, in the application, within the leather covering, of a wooden stay or frame, whereby the collar is made strong and stiff, and whereby the use of hames is dispensed with.

The invention also consists in arranging a removable lower-end piece on the collar, whereby it can be made to fit larger or smaller horses.

The invention also consists in stuffing horse-collars with bristles, instead of straw, heretofore used.

The bristles are much better than straw or hay, as they do not rot, and as they always retain sufficient fatty matter to keep the collar soft, and to prevent it from rubbing through the skin.

A A, in the drawing, are the two side pieces of a collar.

They are, on the outside, formed of wooden plates, $a\ a$, which are lined with metal plates, $b\ b$, said metal plates being sunk in the wood, as shown in fig. 3.

The upper ends of the metal plates $b\ b$ are hinged together, as at $c$, in fig. 2. The whole collar is thereby made jointed, as its lower ends are not rigidly connected. Its sides can be swung out to fit a larger, or drawn together for a smaller horse. Its lower ends can be directly connected, as in fig. 2, by means of a strap, clasp, or other device, $d$, or, for larger horses, a V-shaped block, B, may be interposed between them, as in fig. 1. This block B fits well against the lower ends of the side pieces A, and closes the collar at the bottom. It may have projecting guide-pins, $e\ e$, which fit into the ends of A, and are fastened by the strap $d$, as in fig. 1, or by a spring-clasp, or other equivalent device.

In the market, different sizes of such blocks B will be provided, so that one collar can be readily fitted to any horse.

The inner side of the collar is stuffed with bristles, to form the cushion, C; that is to say, I prefer to stuff it with bristles, as the same are far superior to the matter heretofore used.

The wooden and metallic frame $a\ b$ is entirely covered with leather, as at $f$, in the drawing.

The hames are dispensed with, but may be arranged on the upper part of the collar, as indicated by red lines in fig. 1, to allow the bridle to be placed over them.

The rein-guides $g$, trace-fasteners $h$, and neck-yoke rings $i$, are all secured to this frame A B, as shown.

I claim as new, and desire to secure by Letters Patent—

The horse-collar, consisting of the wooden frame $a$, lined with the cushion C, and faced with the metal plates $b\ b$, hinged together at their upper ends, the whole being covered with leather, and adapted to receive at the lower end the removable V-shaped block B, as herein described, for the purpose specified.

J. MEYER.

Witnesses:
FRANK BLOCKLEY,
ALEX. F. ROBERTS.